United States Patent
Okazaki et al.

(10) Patent No.: US 7,402,354 B2
(45) Date of Patent: Jul. 22, 2008

(54) FUEL CELL APPARATUS

(75) Inventors: Hiroshi Okazaki, Kariya (JP); Kenji Kunieda, Nishikasugai-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 539 days.

(21) Appl. No.: 10/646,822

(22) Filed: Aug. 25, 2003

(65) Prior Publication Data

US 2004/0101727 A1 May 27, 2004

(30) Foreign Application Priority Data

Aug. 27, 2002 (JP) ............................. 2002-247032

(51) Int. Cl.
*H01M 8/04* (2006.01)
(52) U.S. Cl. .......................... 429/26; 165/58
(58) Field of Classification Search .................. 429/26; 165/58, 104.33
See application file for complete search history.

(56) References Cited

U.S. PATENT DOCUMENTS

| | | | | |
|---|---|---|---|---|
| 6,045,933 A | * | 4/2000 | Okamoto ....................... | 429/17 |
| 6,465,118 B1 | * | 10/2002 | Dickman et al. ............... | 429/26 |
| 6,713,204 B2 | * | 3/2004 | Shimanuki et al. ............ | 429/26 |
| 6,824,906 B2 | * | 11/2004 | Wattelet et al. ................ | 429/26 |

FOREIGN PATENT DOCUMENTS

| | | |
|---|---|---|
| JP | 06-283185 | 10/1994 |
| JP | 07-176315 | 7/1995 |
| JP | 8-190926 | 7/1996 |
| JP | 2000-106207 | 4/2000 |
| JP | 2000-223144 | 8/2000 |
| JP | 2001-023668 | 1/2001 |
| JP | 2001-325982 | 11/2001 |
| JP | 2002-216819 | 8/2002 |

* cited by examiner

*Primary Examiner*—Susy Tsang-Foster
*Assistant Examiner*—Alix Echelmeyer
(74) *Attorney, Agent, or Firm*—Oblon, Spivak, McClelland, Maier & Neustadt, P.C.

(57) ABSTRACT

A fuel cell apparatus includes a heat exchange unit including a laminated structure, a water entrance provided at the laminated structure and through which the water from the hot water storage unit flows into the laminated structure, and a water exit provided at the laminated structure and through which the water is discharged out of the laminated structure after the water passes through the laminated structure. The laminated structure is integrally formed into lamination by a heat exchanger for the fuel cell cooling water for recovering heat in the fuel cell cooling water and at least any one of a first heat exchanger for eliminating moisture contained in the fuel-containing material through the heat exchange, a second heat exchanger for eliminating moisture contained in a fuel off-gas through the heat exchange, and a third heat exchanger for eliminating moisture contained in an air off-gas through the heat exchange.

14 Claims, 9 Drawing Sheets

FUEL CELL APPARATUS

This application is based on and claims priority under 35 U.S.C. § 119 with respect to Japanese Application No. 2002-247032 filed on Aug. 27, 2002, the entire content of which is incorporated herein by reference.

FIELD OF THE INVENTION

This invention generally relates to a fuel cell apparatus. More particularly, the present invention pertains to a fuel cell apparatus including a heat exchanger for recovering heat generated by an operation of the fuel cell.

BACKGROUND OF THE INVENTION

Known fuel cell apparatus disclosed in Japanese Patent Laid-Open Publication No. 2000-106207 includes a fuel cell having an electrolyte membrane, a fuel electrode to which a fuel gas is supplied, and an air electrode to which air is supplied. The disclosed fuel cell also includes a fuel cell cooling system for cooling the fuel cell by supplying the cooling water thereto.

Further, such fuel cell generally includes a first heat exchanger for eliminating moisture contained in a fuel gas to be supplied to the fuel cell for power generation through heat exchange, a second heat exchanger for eliminating moisture contained in a fuel off-gas discharged from the fuel cell after the power generation through the heat exchange, a third heat exchanger for eliminating moisture contained in an air off-gas discharged from the fuel cell after the power generation through the heat exchange, and a heat exchanger for fuel cell cooling water for recovering heat in the fuel cell cooling water of the fuel cell cooling system.

The heat exchangers mentioned above are provided separately and thus pipings for connecting the heat exchangers to each other are required. As a result, the structure of the fuel cell apparatus is complicated and also space efficiency thereof is not high. Further, total length of the pipings connecting the heat exchangers to each other is long and thus heat radiation from the pipings is large, thereby restricting the heat recovery amount.

Thus, a need exists for a fuel cell apparatus which obtains a simple structure and high space efficiency, and wherein the heat radiation from the pipings connecting the heat exchangers to each other is decreased.

SUMMARY OF THE INVENTION

According to an aspect of the present invention, a fuel cell apparatus includes a fuel cell having an electrolyte membrane, a fuel electrode provided on one side of the electrolyte membrane and to which a fuel-containing material is supplied, and an air electrode provided on the other side of the electrolyte membrane and to which air is supplied. The fuel cell apparatus also includes a fuel cell cooling system for cooling the fuel cell by supplying a fuel cell cooling water to the fuel cell, and a hot water storage unit for supplying water for recovering heat generated upon operation of the fuel cell through heat exchange. The fuel cell apparatus further includes a heat exchange unit having a laminated structure, a water entrance provided at the laminated structure and through which the water from the hot water storage unit flows into the laminated structure, and a water exit provided at the laminated structure and through which the water from the hot water storage unit is discharged out of the laminated structure after the water passes through the laminated structure. The laminated structure of the heat exchange unit is integrally formed into lamination by a heat exchanger for the fuel cell cooling water for recovering heat in the fuel cell cooling water of the fuel cell cooling system and at least any one of a first heat exchanger for eliminating moisture contained in the fuel-containing material to be supplied to the fuel cell for power generation through the heat exchange, a second heat exchanger for eliminating moisture contained in a fuel off-gas discharged from the fuel cell after the power generation through the heat exchange, and a third heat exchanger for eliminating moisture contained in an air off-gas discharged from the fuel cell after the power generation through the heat exchange.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Embodiments of the present invention are explained referring to attached drawings. A fuel cell apparatus according to the present invention is a stationary type and includes a stack 2 formed by laminating a plurality of fuel cells 1 in a thickness direction of the fuel cell apparatus (X direction in FIG. 1), a stack frame 3 for holding the stack 2, an air fan 4 mounted on a top portion of the stack frame 3 and supplying air to the fuel cells 1, and a heat exchange unit 5 provided on a lower side of the stack 2. The fuel cell apparatus also includes a first manifold plate 6 and a second manifold plate 7 facing each other with respect to the stack 2 so as to connect side portions of the stack frame 3 to each other, and a radiator 8 provided on the lower side of the stack 2, being positioned next to the heat exchange unit 5 and having a heat radiation and cooling functions. The fuel cell apparatus further includes a hot water storage unit 9 for flowing water for supplying heat generated at the fuel cell apparatus through heat exchange.

Figure 1:
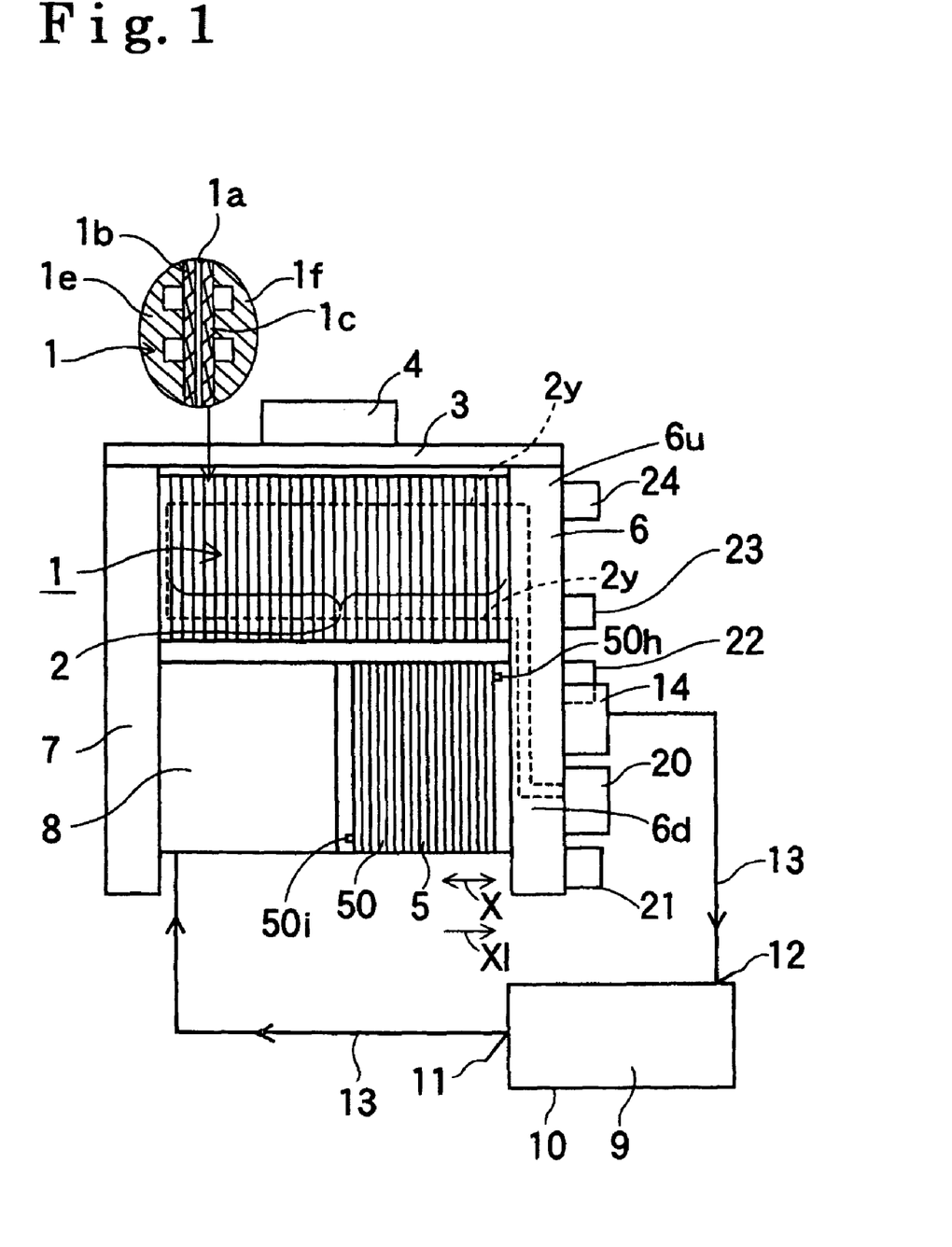
FIG. 1 is a side view of a fuel cell apparatus according to embodiments of the present invention.

As shown in FIG. 1, the fuel cell 1 includes a polymer electrolyte membrane 1a formed by proton exchange membrane, a fuel electrode 1b provided on one side of the electrolyte membrane 1a in the X direction and to which a fuel gas (hydrogen gas) is supplied, and an air electrode 1c provided at the other side of the electrolyte membrane 1a in the X direction and to which air (oxygen gas) is supplied. The fuel cell 1 also includes a separator 1e on a side of the fuel electrode 1b having grooves through which the fuel gas is supplied to the fuel electrode 1b, and a separator if on a side of the air electrode 1c having grooves through which the air is supplied to the air electrode 1c. The fuel electrode 1b is formed by a catalyst layer having a catalyst material such as platinum and also a porous gas diffusion layer. In addition, the air electrode 1c is formed by the catalyst layer having the catalyst material such as platinum and also the porous gas diffusion layer.

As shown in FIG. 1, the hot water storage unit 9 recovers heat of the fuel cell apparatus and maintains that heat as the hot water, which is to be provided for any other uses. In addition, the hot water storage unit 9 includes a hot water storage tank 10, a heat recovery passage 13 connecting an exit 11 and an entrance 12 of the hot water storage tank 10, and a first pump 14 (water delivery means) provided at the heat recovery passage 13. When the first pump 14 is driven, the water in the hot water storage tank 10 is discharged from the exit 11 for heat exchange and then supplied to a water entrance 50i of the heat exchange unit 5 via the heat recovery passage 13 and the radiator 8. The temperature of the water is increased by the heat exchange in the heat exchange unit 5. Further, the heated water returns to the entrance 12 of the hot water storage tank 10 via a water exit 50h of the heat exchange unit 5 and the heat recovery passage 13. Since the water in the hot water storage tank 10 is cooled in the radiator 8 for heat radiation before being supplied to the water entrance 50i of the heat exchange unit 5, the cooling function and the heat exchange function at the heat exchange unit 5 can be assured.

As shown in FIG. 1, the first pump 14 for carrying the water in the hot water storage unit 9 and a second pump 20 serving as the fuel cell cooling system for cooling the stack 2 by circulating the fuel cell cooling water into a cooling, passage 2y formed in the stack 2 are provided at a lower portion 6d, facing a side portion of the heat exchange unit 5, of the first manifold plate 6. In addition, a first opening/closing valve 21 and a second opening/closing valve 22 are provided at the lower portion 6d of the first manifold plate 6. Further, a third opening/closing valve 23 and a fourth opening/closing valve 24 are provided at an upper portion 6u, facing a side portion of the stack 2, of the first manifold plate 6.

Figure 2:
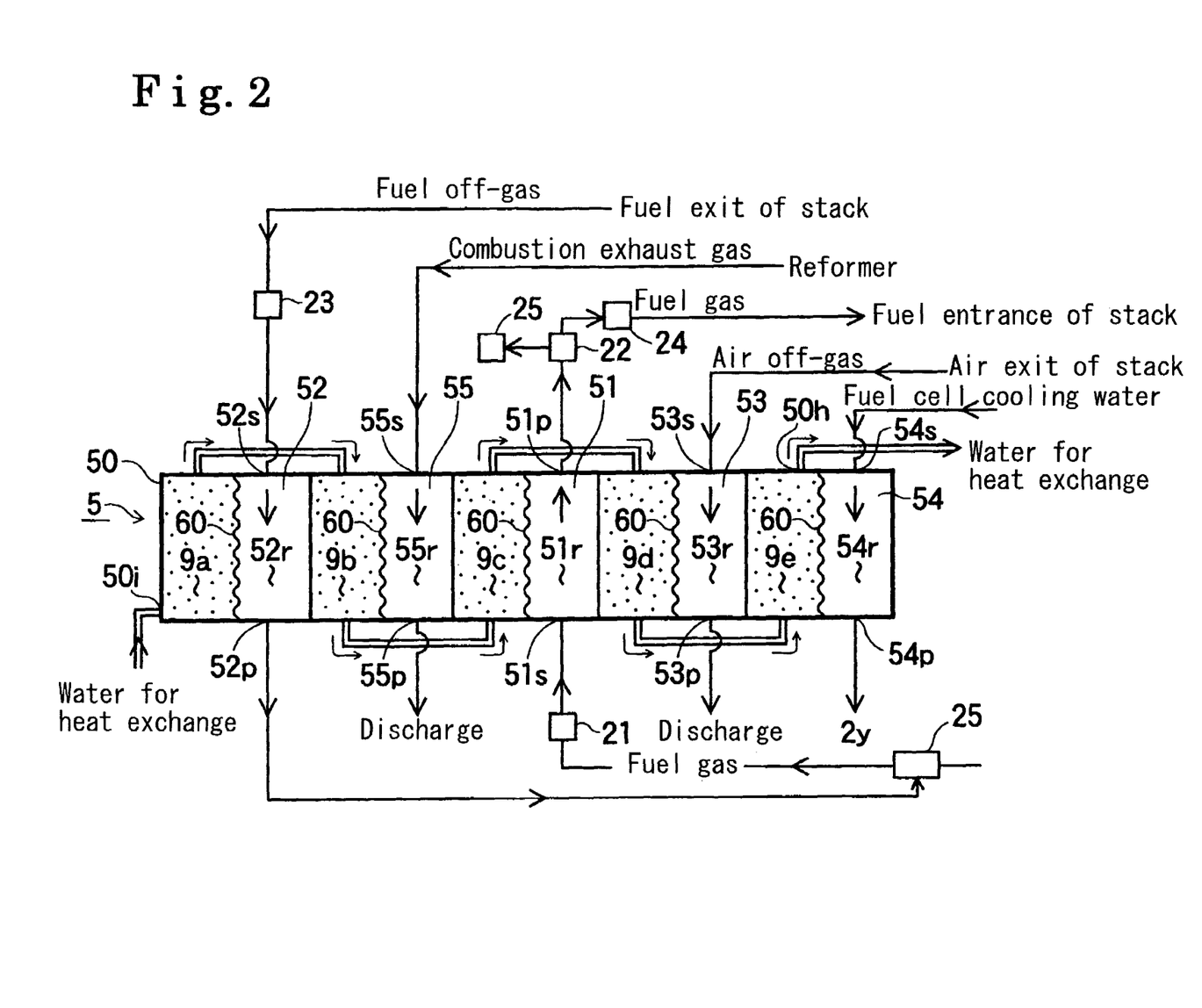
FIG. 2 is a schematic view showing a laminated structure of a heat exchange unit according to a first embodiment of the present invention.

FIG. 2 is a schematic view showing the heat exchange unit 5 and vicinity thereof. As shown in FIG. 2, the heat exchange unit 5 includes a first heat exchanger 51, a second heat exchanger 52, and a third heat exchanger 53. The first exchanger 51 eliminates and recovers moisture and heat in the fuel gas to be supplied to the fuel cells 1 for power generation. The second heat exchanger 52 eliminates and recovers moisture and heat in fuel off-gas discharged from a fuel exit of the stack 2 after the power generation. The third heat exchanger 53 eliminates and recovers moisture and heat in air off-gas discharged from an air exit of the stack 2 after the power generation. Further, the heat exchange unit 5 includes a heat exchanger 54 for the fuel cell cooling water and a heat exchanger 55 for combustion exhaust gas. The heat exchanger 54 recovers heat in the fuel cell cooling water, which is discharged from a fuel cell cooling water exit after being supplied to a fuel cell cooling water entrance of the stack 2 for cooling the fuel cells 1. The heat exchanger 55 recovers moisture and heat in the combustion exhaust gas discharged from a reformer 25.

Figure 3:
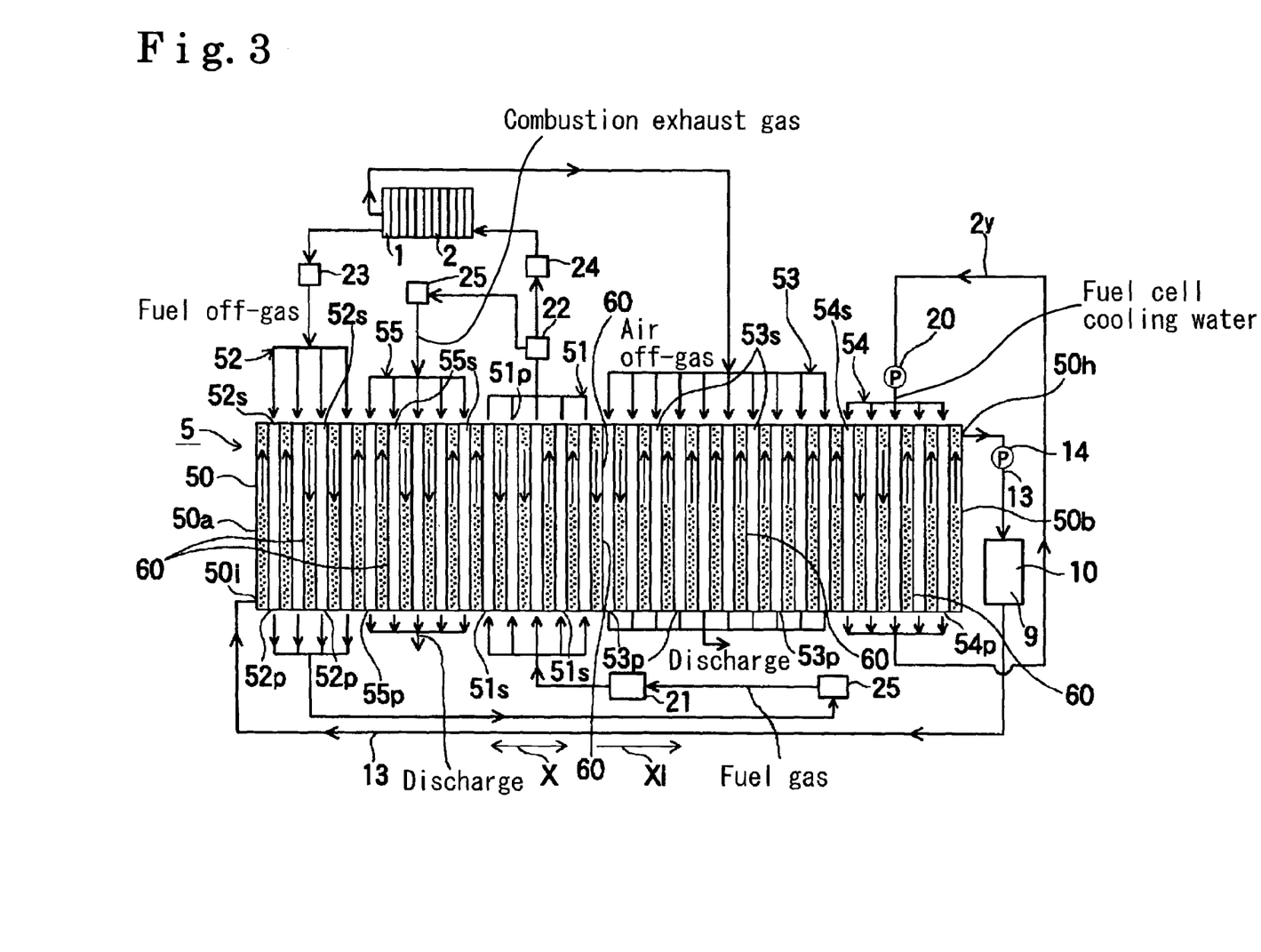
FIG. 3 is a schematic view showing an inner structure of the laminated structure of the heat exchange unit according to the first embodiment of the present invention.

FIG. 3 is a schematic view showing an inner structure of the heat exchange unit 5. As shown in FIG. 3, the heat exchange unit 5 is mainly formed by a laminated structure 50. The water entrance 50i into which the water in the hot water storage unit 9 enters is provided at a starting side 50a in laminating direction (X direction in FIG. 3) of the laminated structure 50. The water exit 50h from which the water having passed the laminated structure 50 exits to enter into the hot water storage unit 9 is provided at an end side 50b in the laminating direction of the laminated structure 50. The water entrance 50i is formed at a lower portion of the starting side 50a in the laminating direction of the laminated structure 50 while the water exit 50h is formed at an upper portion of the end side 50b so that heat convection of the water is assured.

As shown in FIG. 3, the second heat exchanger 52, the heat exchanger 55 for the combustion exhaust gas, the first heat exchanger 51, the third heat exchanger 53, and the heat exchanger 54 for the fuel cell cooling water are serially and integrally laminated along with X1 direction in order from the starting side 50a to the end side 50b of the laminated structure 50 in the heat exchange unit 5. The water sent from the hot water storage unit 9 flows basically from the starting side 50a to the end side 50b in the laminated structure 50. That is, the water flows in the X1 direction in FIG. 3. The water sent from the hot water storage unit 9 by the driving of the first pump 14 flows generally from the water entrance 50i through the second heat exchanger 52, the heat exchanger 55 for the combustion exhaust gas, the first heat exchanger 51, the third heat exchanger 53, and the heat exchanger 54 for the fuel cell cooling water in order in the laminated structure 50. Then the water is discharged from the water exit 50h.

As shown in FIG. 2, water 9a, 9b, 9c, 9d and 9e in the second heat exchanger 52, the heat exchanger 55 for the combustion exhaust gas, the first heat exchanger 51, the third heat exchanger 53, and the heat exchanger 54 for the fuel cell cooling water respectively flows in order in the laminated structure 90 of the heat exchange unit 5.

In the reformer 25 shown in FIG. 2, combustion is caused by fuel supplied from a fuel source (not shown) and then an evaporating portion of the reformer 25 is maintained at high temperature. In addition, water is provided from a water source (not shown) to the evaporating portion at the high temperature, thereby generating water vapor. When the fuel supplied from the fuel source and the water vapor are mixed together, reforming reaction occurs. Then, the fuel gas, i.e. the reformed gas containing hydrogen, is generated in the reformer 25.

When the fuel cell apparatus is operated, the fuel gas (hydrogen gas) reformed in the reformer 25 is supplied to the fuel electrode 1b of the stack 2. Further, air (oxygen gas) is supplied to the air electrode 1c of the stack 2 by the operation of the air fan 4. The fuel gas and the air are used for the power generation reaction in the fuel cells 1 of the stack 2.

As mentioned above, the water stored in the hot water storage tank 10 of the hot water storage unit 9 flows into the laminated structure 50 via the heat recovery passage 13 and the water entrance 50i of the laminated structure 50 by the operation of the first pump 14. The water, i.e. the water 9a, 9b, 9c, 9d and 9e, is gradually heated when passing through the heat exchange unit 5. The heated water flows out of the water exit 50h of the laminated structure 50 and returns as the hot water to the hot water storage tank 10 via the heat recovery passage 13. Accordingly, the water sent from the hot water storage unit 9 is gradually heated when flowing in the laminated structure 50. That is, the water is gradually heated while flowing from the water entrance 50i to the water exit 50h. The heat generated upon operation of the fuel cell apparatus is recovered in the water stored in the hot water storage unit 9 as the hot water.

According to the present embodiment, when the water delivered from the hot water storage unit 9 flows into the laminated structure 50, the temperature of the water is relatively low on a side of the water entrance 50i (upstream side) and relatively high on a side of the water exit 50h (downstream side) in the heat exchange unit 5.

The solid polymer fuel cells 1 are generally operated in a temperature range approximately between 80 degrees and 100 degrees. In the operation of the fuel cell apparatus, the power generation performance thereof is lowered if the operation temperature of the fuel cells 1 is excessively high. Thus, when the fuel cells 1 are operated, the fuel cell cooling water is supplied to the cooling passage 2y of the stack 2 by the operation of the second pump 20. The stack 2 is therefore cooled, prevented from being overheated, and able to operate continuously. As shown in FIG. 2, the fuel cell cooling water, which has cooled the stack 2, flows downward from a fourth entrance 54s formed at an upper portion of the heat exchanger 54 for the fuel cell cooling water through a flat-shaped fourth heat exchange passage 54r. The fuel cell cooling water is then cooled by exchanging the heat thereof with the water 9e delivered from the hot water storage unit 9 and discharged to the outside of the heat exchanger 54 from a fourth exit 54p formed at a lower portion of the heat exchanger 54. The fuel cell cooling water is circulated into the cooling passage 2y of the stack 2 and thus the stack 2 is prevented from being overheated, thereby assuring the power generation performance of the fuel cell 1.

When the temperature of the fuel cell cooling water is excessively low, the fuel cells 1 are also excessively cooled and therefore the original power generation performance of the fuel cells 1 may not be obtained sufficiently. Then, according to the present embodiment, the heat exchanger 54 for the fuel cell cooling water, which recovers the heat in the fuel cell cooling water for cooling the fuel cells 1, is provided in a nearest position to the water exit 50h (i.e. most downstream side) in the laminating direction of the laminated structure 50 of the heat exchange unit 5. That is, the heat exchanger 54 is arranged on a highest temperature side in the laminated structure 50. The heat of the fuel cell cooling water for cooling the stack 2 is therefore exchanged with the water 9e placed on the highest temperature side in the laminated structure 50, thereby preventing the excessive decrease of the temperature of the fuel cell cooling water. Further, the fuel cells 1 are prevented from being overcooled and the power generation performance of the fuel cells 1 can be assured.

The fuel gas to be supplied to the fuel entrance of the stack 2 for the power generation is reformed in the reformer 25 as mentioned above and thus obtains high temperature and a great amount of water vapor. The operation temperature of the solid polymer fuel cell 1 is generally specified within the range approximately between 80 degrees and 100 degrees. The fuel gas to be supplied to the fuel cells 1 for the power generation is desirably cooled by heat exchanging with the water at relatively lower temperature and then supplied to the stack 2. According to the present embodiment, the fuel gas is first sent from the reformer 25 to the first heat exchanger 51 via the first opening/closing valve 21. The fuel gas flows upward through a flat-shaped first heat exchange passage 51r from a first entrance 51s formed at a lower portion of the first heat exchanger 51 of the laminated structure 50. The fuel gas is cooled in the first heat exchanger 51 by the heat exchange with the water 9c, and then discharged from a first exit 51p formed at an upper portion of the first heat exchanger 51. The fuel gas is supplied to the fuel entrance of the stack 2 via the second opening/closing valve and the fourth opening/closing valve 24. The fuel gas is finally used for the power generation reaction in the stack 2. The second opening/closing valve 22 is provided so as to return the fuel gas to the reformer 25 in case that the fuel gas is not adequate for the power generation at a time immediately after the initiation of the fuel cell apparatus.

The fuel gas to be supplied to the fuel cells 1 for the power generation, which contains the water vapor, is cooled in the first heat exchanger 51 by the heat exchange with the water 9c therein. As a result, condensed water is generated from the fuel gas in the first heat exchange passage 51r. The moisture contained in the fuel gas is recovered in the first heat exchange passage 51r. At the same time, the heat therein is recovered by the water 9c. As shown in FIGS. 2 and 3, the first heat exchanger 51, which eliminates and recovers the moisture and the heat in the fuel gas, is provided close to the water entrance 50i (upstream side) relative to the heat exchanger 54 for the fuel cell cooling water and the third heat exchanger 53 in the laminated structure 50. Specifically, the first heat exchanger 51 is arranged on the lower temperature side in the laminated structure 50. Therefore, the fuel can be cooled in the first heat exchanger 51 by the heat exchange with the water 9c at the relatively low temperature. The moisture and the heat can be efficiently recovered from the fuel gas containing the water vapor accordingly.

When the fuel cell apparatus is operated, the fuel is burnt in a combustor of the reformer 25, thereby generating the combustion exhaust gas as mentioned above. The temperature of the combustion exhaust gas is considerably high after the combustion reaction. According to the present embodiment, the combustion exhaust gas at high temperature discharged from the reformer 25 flows downward through a flat-shaped heat exchange passage 55r of the heat exchanger 55 for the combustion exhaust gas from a fifth entrance 55s formed at an upper portion of the heat exchanger 55. The combustion exhaust gas is then cooled by the heat exchange with the water 9b in the heat exchanger 55 and discharged from a fifth exit 55p formed at a lower portion of the heat exchanger 55 into the outside air.

As shown in FIG. 2, the heat exchanger 55 for the combustion exhaust gas is provided close to the water entrance 50i (upstream side) relative to the heat exchanger 54 for the fuel cell cooling water, the third heat exchanger 53, and the first heat exchanger 51. The combustion exhaust gas at the high temperature discharged from the reformer 25 is cooled by the heat exchange with the water 9b at the appropriate temperature flowing in the heat exchanger 55. Then, the heat in the combustion exhaust gas can be efficiently recovered by the water 9b.

The air off-gas is discharged from the air exit of the stack 2 after the power generation. The air off-gas discharged after the power generation obtains a great amount of the water vapor and thus humidity of the air off-gas is considerably high. This is because the water is generated at the air electrode 1c of the fuel cell 1 in accordance with the power generation reaction. The air off-gas is generally in substantially saturated vapor state. The humidity of the air off-gas also reaches substantially a hundred percent. Thus, the condensed water can be generated and recovered from the air off-gas discharged from the stack 2 only by slightly cooling the air off-gas. Even when the temperature of the water 9d in the third heat exchanger 53 is relatively high in the laminated structure 50, the moisture in the air off-gas can be eliminated and recovered by the heat exchange with the water 9d if the temperature thereof is lower than that of the air-off gas. According to the present embodiment, the air off-gas containing a great amount of the water vapor, which has discharged from the stack 2, flows downward through a flat-shaped third heat exchange passage 53r of the third heat exchanger 53 from a third entrance 53s formed at an upper portion of the third heat exchanger 53. The air off-gas is then cooled in the third heat exchanger 53 by the heat exchange with the water 9d, and discharged to the outside of the third heat exchanger 53 from a third exit 53p formed at a lower portion of the third heat exchanger 53. The condensed water is generated from the air off-gas in the third heat exchanger 53 of the laminated structure 50. The condensed water is received on a bottom portion of the third heat exchanger 53 and recovered therefrom. As shown in FIG. 2, the third heat exchanger 53 is provided close to the water entrance 50i relative to the heat exchanger 54 for the fuel cell cooling water in the laminated structure 50.

The temperature of the fuel off-gas discharged from the fuel exit of the stack 2 after the power generation is substantially equal to or slightly lower than the operation temperature of the fuel cell 1. Thus, the temperature of the water 9a for the heat exchange with the fuel off-gas is desirably relatively lower in order to recover the moisture and the heat from the fuel off-gas. According to the present embodiment, in order to recover the moisture and the heat in the fuel off-gas, the fuel off-gas is first discharged from the fuel exit of the stack 2 to the second heat exchanger 52 via the third opening/closing valve 23. The fuel off-gas then flows through a flat-shaped second heat exchange passage 52r from a second entrance 52s formed at an upper portion of the second heat exchanger 52. The fuel off-gas is cooled in the second heat exchanger 52 by the heat exchange with the water 9a and then discharged from a second exit 52p formed at a lower portion of the second heat exchanger 52. The condensed water is generated and recovered from the fuel off-gas in the second heat exchanger 52. At the same time, the heat is recovered from the fuel-off gas by the water 9a. The second heat exchanger 52, which recovers the moisture and the heat in the fuel off-gas, is provided on the closest side to the water entrance 50i (upstream side) in the laminated structure 50. That is, the second heat exchanger 52 is arranged on the relatively lowest temperature side in the laminated structure 50. Since the temperature of the fuel off-gas discharged from the fuel exit of the stack 2 is low, the temperature of the water 9a is desirably low in order to recover the moisture and the heat from the fuel off-gas. The fuel off-gas is sent to the reformer 25 and burnt in the combustor thereof for recycling after the moisture and the heat are recovered in the heat exchange unit 5 since the fuel off-gas still obtains unburnt combustible content.

As shown in FIGS. 2 and 3, fluid such as gas is basically flows from the upper side to the lower side of the laminated structure 50. This is because the moisture recovered in each heat exchanger can be received on the bottom portion of each heat exchanger, and also the stack 2 for discharging the fuel off-gas, the air off-gas, and the fuel cell cooling water is provided at the upper side relative to the heat exchange unit 5.

As shown in FIGS. 2 and 3, the fuel off-gas in the second heat exchanger 52, the combustion exhaust gas in the heat exchanger 55, the air off-gas in the third heat exchanger 53, and the fuel cell cooling water in the heat exchanger 54 each flow from the upper side to the lower side. In addition, the fuel gas flows from the lower side to the upper side in the first heat exchanger 51 in order to send the fuel gas, whose heat is exchanged with the water in the heat exchange unit 5, from the heat exchange unit 5 provided at the lower side to the stack 2 provided at the upper side in the fuel cell apparatus.

Figure 4:
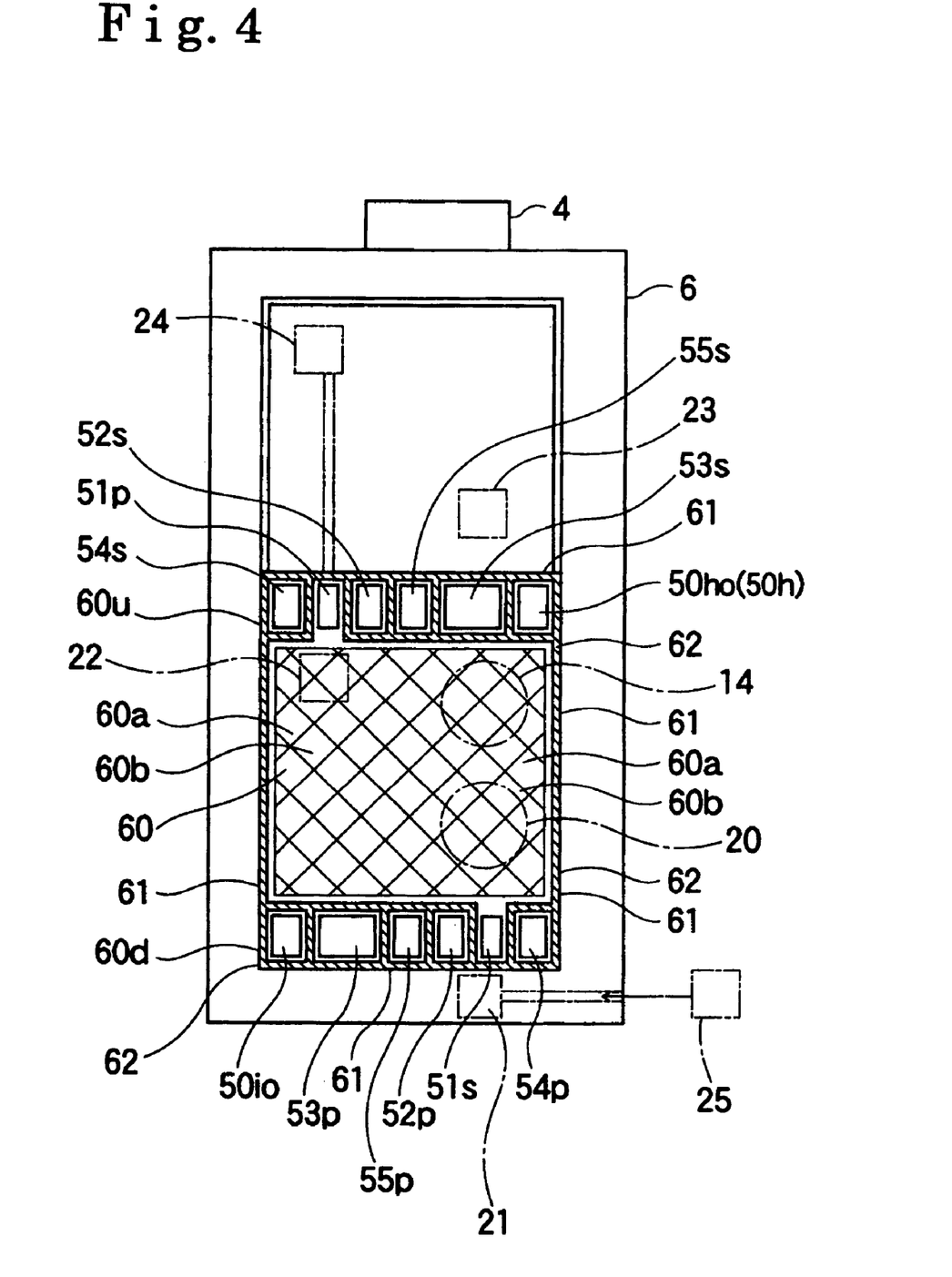
FIG. 4 is a schematic view showing a manifold.

FIG. 4 is a view showing the first manifold plate 6 and vicinity thereof. Common plates 60 constitute the heat exchange unit 5, i.e. the first heat exchanger 51, the second heat exchanger 52, the third heat exchanger 53, the heat exchanger 54 for the fuel cell cooling water, and the heat exchanger 55 for the combustion exhaust gas. In addition, each common plate 60 having a rectangular thin sheet shape is formed by metal with high heat conductance and corrosion resistance. As shown in FIG. 4, a plurality of convex portions 60a and a plurality of concave portions 60b are alternately formed at each center portion of one face and the other face of the common plate 60. The dimension for heat exchange is thus increased in order to obtain high heat exchange efficiency.

As shown in FIG. 4, a seal engaging portion 61 having a concave/convex shape is formed at an outer peripheral edge of one face and the other face of the common plate 60. The fourth entrance 54s, the first exit 51p, the second entrance 52s, the fifth entrance 55s, the third entrance 53s, and a connecting passage 50ho connected to the water exit 50h are formed in order from one end to the other end of an upper side portion 60u of the common plate 60 by extending in the thickness direction of the heat exchange unit 5.

In addition, a connecting passage 50io connected to the water entrance 50i, the third exit 53p, the fifth exit 55p, the second exit 52p, the first entrance 51s, and the fourth exit 54p are formed in order from one end to the other end of a lower portion 60d of the common plate 60 by extending in the thickness direction of the heat exchange unit 5. As shown in FIG. 4, the connecting passages 50io and 50ho are arranged at opposite angles to each other in the common plate 60 and thus a sufficient distance for the heat exchange is ensured between the connecting passages 50io and 50ho. The fourth entrance 54s and the fourth exit 54p are also arranged at opposite angles to each other in the common plate 60 and therefore the sufficient distance for the heat exchange is ensured between the fourth entrance 54s and the fourth exit 54p. Dimensions of openings of the third entrance 53s and the third exit 53p respectively through which the air off-gas flows are defined larger than those of other entrances or exits since the flow amount of the air off-gas per unit of time is relatively larger.

Figure 5:
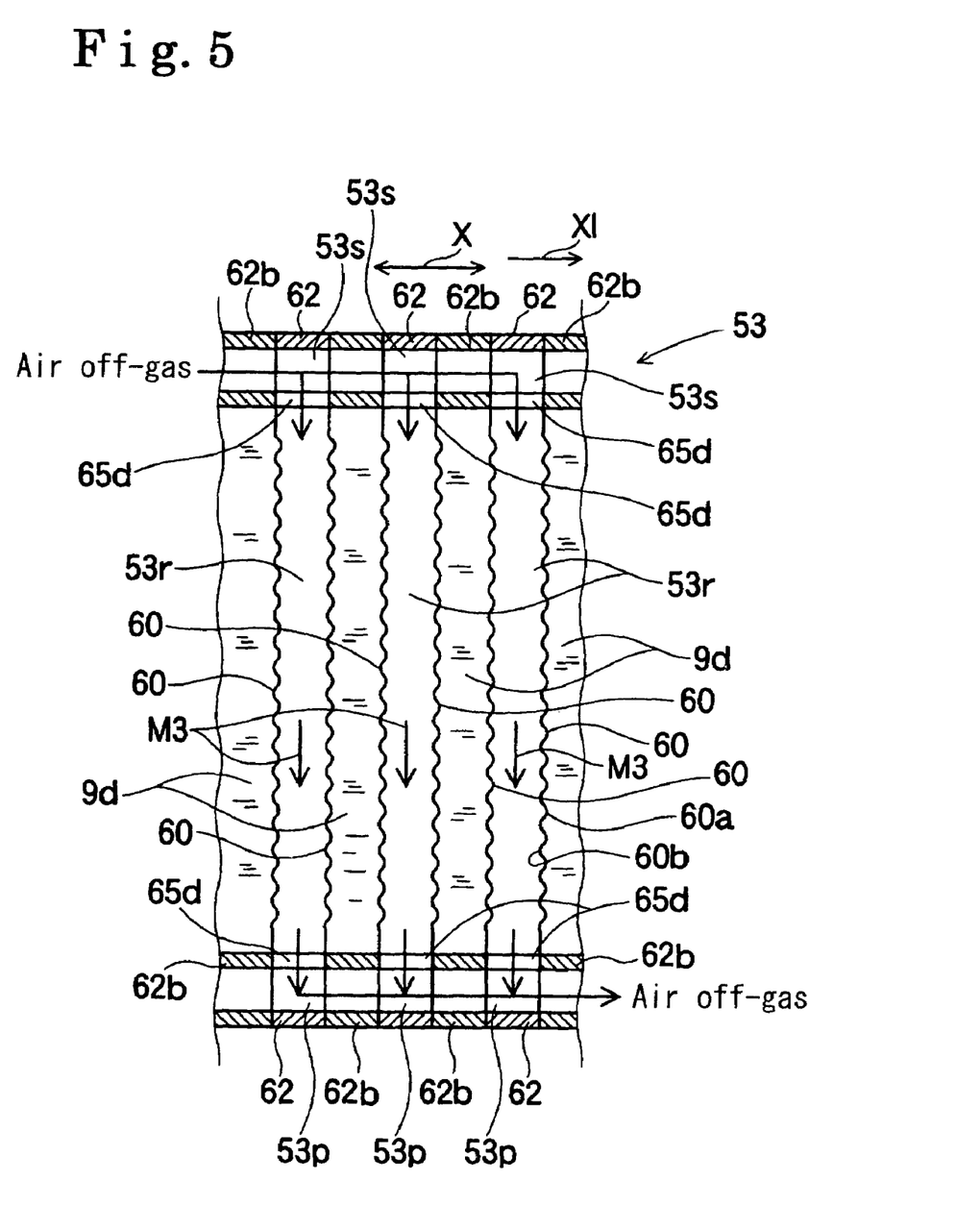
FIG. 5 is a cross-sectional view showing a main portion of the laminated structure of the heat exchange unit.

As shown in FIG. 4, a seal frame 62 having a rectangular frame shape is formed by flexible seal member such as rubber and plastic. The seal frame 62 engages with the seal engaging portion 61 and is held by the common plate 60. Further, the seal frame 62 seals each space defined by each pair of the common plates 60 arranged next to each other in the lamination direction (X direction in FIG. 5) as shown in FIG. 5.

Figure 6:
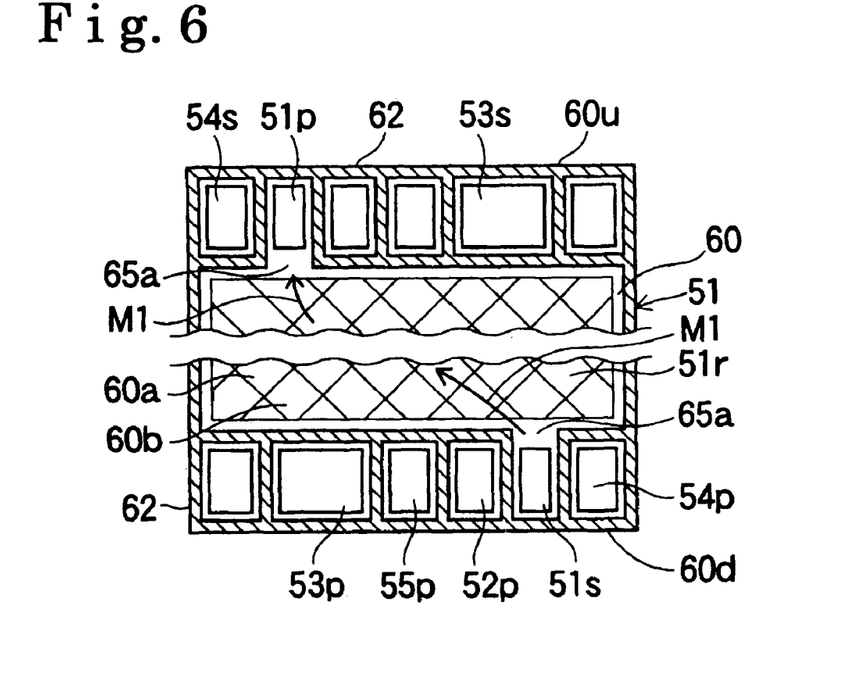
FIG. 6 is a front view showing a main portion of a first heat exchanger in the laminated structure of the heat exchange unit.

As shown in FIG. 6, notches 65a are formed at respective portions of the seal frame 62 facing the first entrance 51s and the first exit 51p through which the fuel gas flows in the first heat exchanger 51. The first entrance 51s and the first exit 51p are both connected to the first heat exchange passage 51r so that the fluid such as gas can pass through the first heat exchanger 51 in M1 direction (upward direction) in FIG. 6.

Figure 7:
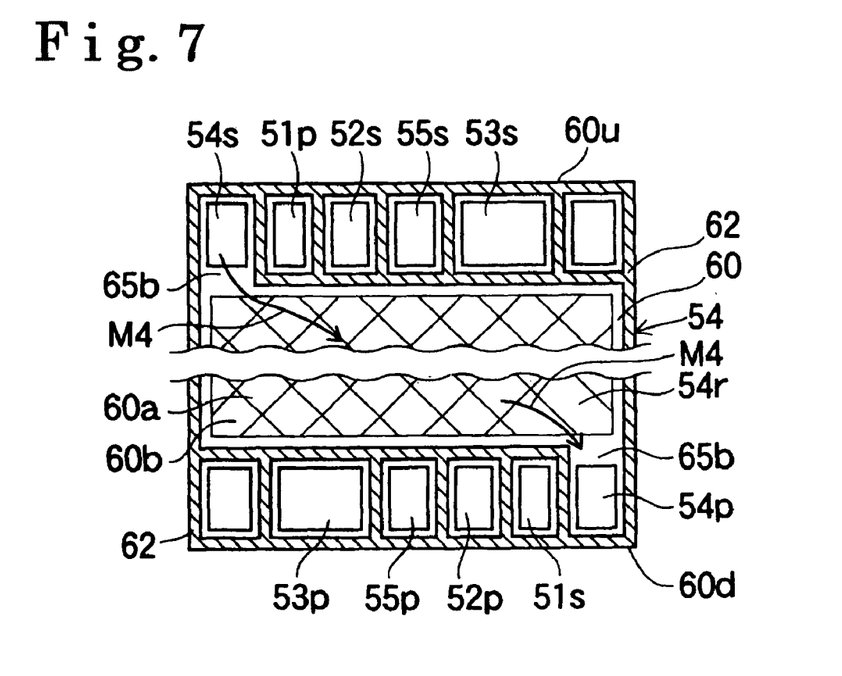
FIG. 7 is a front view showing a main portion of a heat exchanger for fuel cell cooling water in the laminated structure of the heat exchange unit.

As shown in FIG. 7, notches 65b are formed at respective portions of the seal frame 62 facing the fourth entrance 54s and the fourth exit 54p through which the fuel cell cooling water flows in the heat exchanger 54 for the fuel cell cooling water. The fourth entrance 54s and the fourth exit 54p are both connected to the fourth heat exchange passage 54r so that the fluid such as the fuel cell cooling water can pass through the heat exchanger 54 in M4 direction (downward direction) in FIG. 7.

Figure 8:
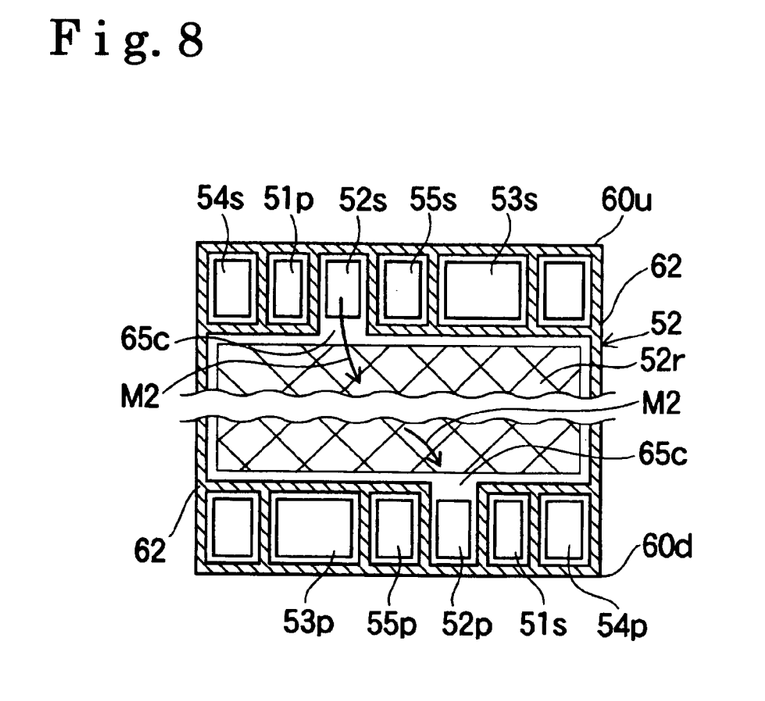
FIG. 8 is a front view showing a main portion of a second heat exchanger in the laminated structure of the heat exchange unit.

As shown in FIG. 8, notches 65c are formed at respective portions of the seal frame 62 facing the second entrance 52s and the second exit 52p through which the fuel off-gas flows in the second heat exchanger 52. The second entrance 52s and the second exit 52p are both connected to the second heat exchange passage 52r so that the fluid such as gas can pass through the second heat exchanger 52 in M2 direction (downward direction) in FIG. 8.

Figure 9:
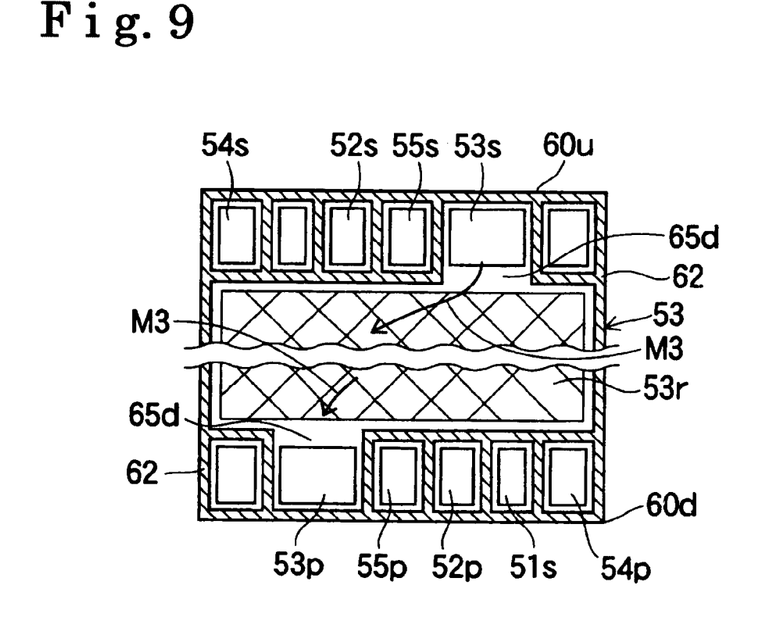
FIG. 9 is a front view showing a main portion of a third heat exchanger in the laminated structure of the heat exchange unit.

As shown in FIG. 9, notches 65d are formed at respective portions of the seal frame 62 facing the third entrance 53s and the third exit 53p through which the air off-gas flows in the third heat exchanger 53. The third entrance 53s and the third exit 53p are both connected to the third heat exchange passage 53r so that the fluid such as gas can pass through the third heat exchanger 53 in M3 direction (downward direction) in FIG. 9.

Figure 10:
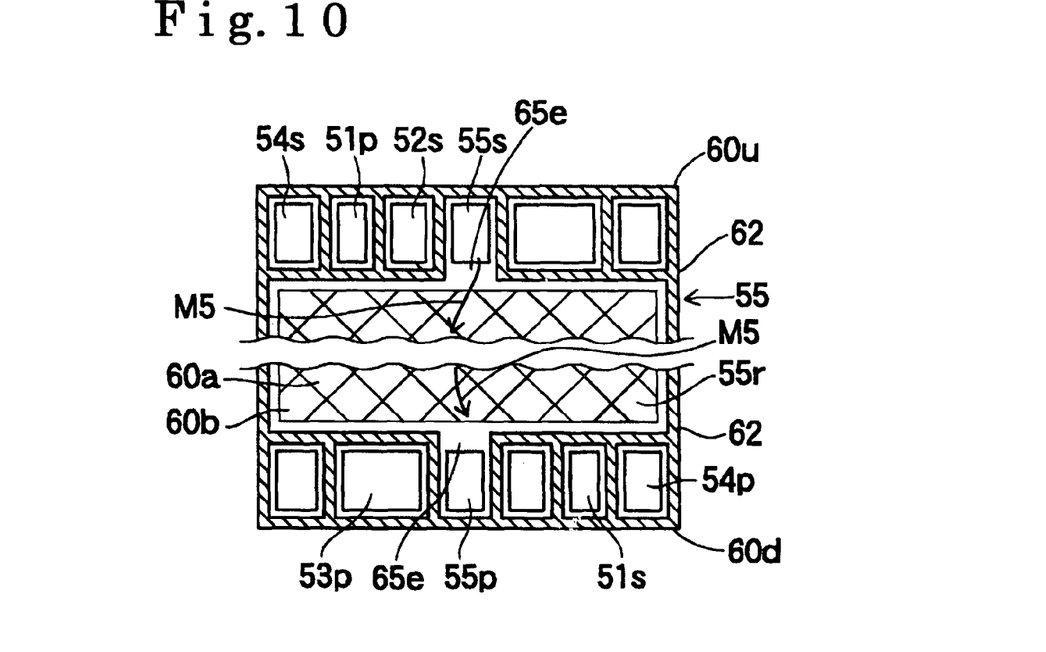
FIG. 10 is a front view showing a main portion of a heat exchanger for combustion exhaust gas in the laminated structure of the heat exchange unit.

As shown in FIG. 10, notches 65e are formed at respective portions of the seal frame 62 facing the fifth entrance 55s and the fifth exit 55p through which the combustion exhaust gas flows in the heat exchanger 55. The fifth entrance 55s and the fifth exit 55p are both connected to the fifth heat exchange passage 55r so that the fluid such as gas can pass through the heat exchanger 55 for the combustion exhaust gas in M5 direction (downward direction) in FIG. 10.

Figure 11:
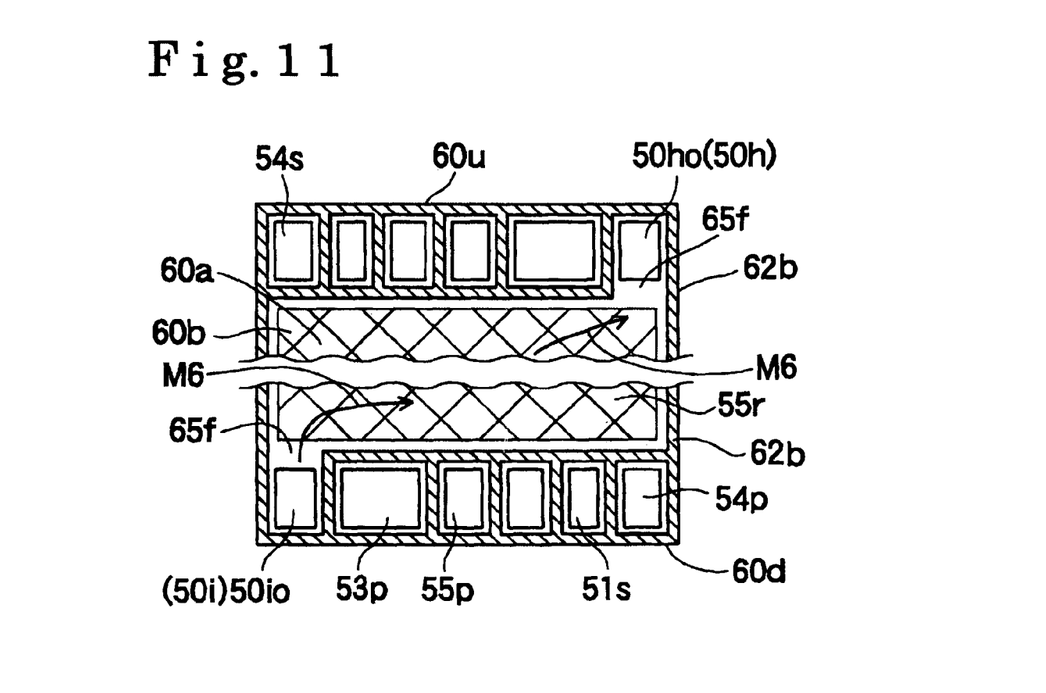
FIG. 11 is a front view showing a passage through which water for heat exchange in each heat exchanger in the laminated structure flows.

As shown in FIGS. 5 and 11, a seal frame 62b for forming each passage through which the water for the heat exchange, i.e. water 9a through 9e passes through is also held by the common plate 60. Notches 65f are formed at respective portions of the seal frame 62b facing the connecting passage 50io connected to the water entrance 50i and the connecting passage 50ho connected to the water exit 50h. The connecting passages 50io and 50ho are connected so that the fluid such as the water can pass through the heat exchange unit 5 in M6 direction in FIG. 11. In FIG. 11, the water flows from the lower side to the upper side. However, the water also flows from the upper side to the lower side as shown in FIG. 3.

According to the present embodiment as mentioned above, the second heat exchanger 52, the heat exchanger 55 for the combustion exhaust gas, the first heat exchanger 51, the third heat exchanger 53, and the heat exchanger 54 for the fuel cell cooling water are integrally and closely formed into lamination in order from the starting side 50a to the end side 50b, i.e. in the X1 direction, in the laminated structure 50 of the heat exchange unit 5.

Thus, the structure of piping for connecting the heat exchangers 51 through 55 is simplified and the length thereof is reduced. In addition, only a small piping space is required and thus space efficiency is improved, thereby achieving downsizing of the fuel cell apparatus. Since the length of the piping for connecting the heat exchangers 51 through 55 is reduced, the heat radiation from the piping is less, thereby increasing the heat recovery amount of the heat exchange unit 5. Further, number and cost of parts can be decreased due to the simplified structure of the piping.

The common plates 60 can be considered to be arranged in horizontal direction of the heat exchange unit 5. According to the present embodiment, however, the common plates 60 constituting the heat exchangers 51 through 55 are arranged in vertical direction. Thus, the air off-gas, the fuel off-gas and the like flow downward in each heat exchanger for which gravity can be utilized. In addition, drift velocity of the fluid such as the air off-gas and the fuel off-gas in each heat exchanger can be increased, thereby ensuring the power generation performance of the fuel cell apparatus. When the drift velocity of the fluid such as the air off-gas and the fuel off-gas is increased, the sufficient heat exchange amount may not be obtained in each heat exchanger. According to the present embodiment, number of common plates 60 constituting the heat exchangers 51 through 55 is increased so that the heat exchange amount can be improved.

Figure 12:
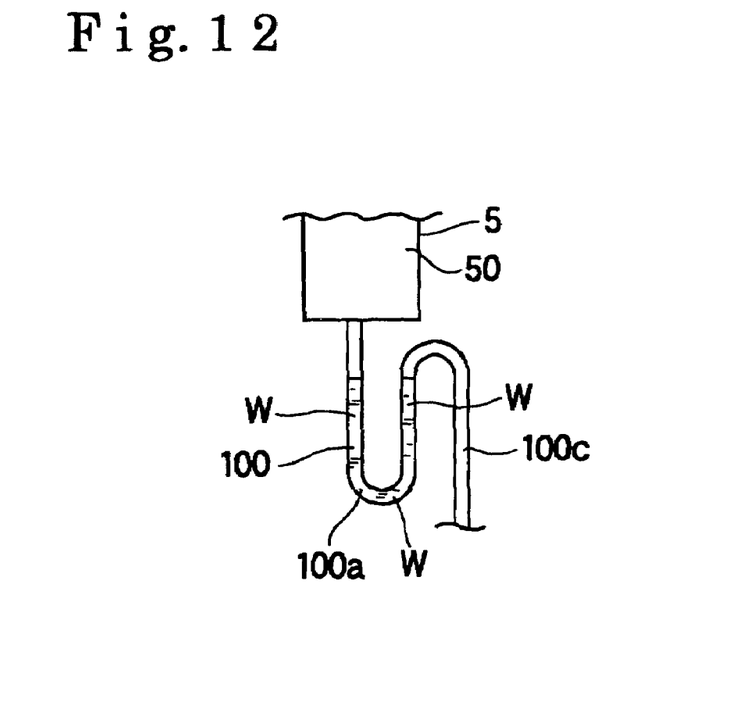
FIG. 12 is a schematic view showing a manometeric seal tube provided on a bottom side of the laminated structure.

According to the present embodiment, the fuel cells 1 are provided on the upper side relative to the laminated structure 50 of the heat exchange unit 5. Thus, the air off-gas, the fuel off-gas, and the fuel cell cooling water discharged from the fuel cells 1 flow naturally downward (i.e. in the vertical direction) in the laminated structure 50. The recovered water can be easily received on the bottom portion of the laminated structure 50 of the heat exchange unit 5. When the recovered water is received on the bottom portion of the laminated structure 50, it is easy to collect the water therefrom. Further, as shown in FIG. 12, a manometric seal tube 100 for storing recovered water W is provided at a lower portion of the laminated structure 50. Therefore, sealability of an inner space of the laminated structure, 50 can be assured by the recovered water W in the seal tube 100, which helps to prevent gas leak from the inner space of the laminated structure 50. The seal tube 100 includes a U-shaped portion 100a and an inverted U-shaped portion 100c.

Even if water immersion occurs in the fuel cell apparatus due to a disaster, an accident and the like, the fuel cell 1, which is expensive as consisting the catalyst material such as platinum, can be protected since the fuel cell 1 is provided on the upper side relative to the laminated structure 50. Further, the radiator 8 is provided next to the laminated structure 50 of the heat exchange unit 5 and cooling the water before the water enters into the heat exchange unit 5. Thus, the heat exchange performance of the heat exchange unit 5 is ensured.

In order to further increase the power generation performance of the stack 2, it is considered to increase number of laminations of the fuel cells 1 of the stack 2 and enlarge a size of the stack 2 in the lamination direction thereof. In this case, the heat exchange performance of the heat exchange unit 5 is also required to be increased. According to the present embodiment, the lamination direction (lateral direction) of the laminated structure 50 of the heat exchange unit 5 corresponds to that of the fuel cells 1 of the stack 2. Thus, when number of the laminations of the fuel cells 1 is increased, the heat exchange performance of the heat exchange unit 5 can be easily improved by increasing number of the laminations of the laminated structure 50 of the heat exchange unit 5.

Figure 13:
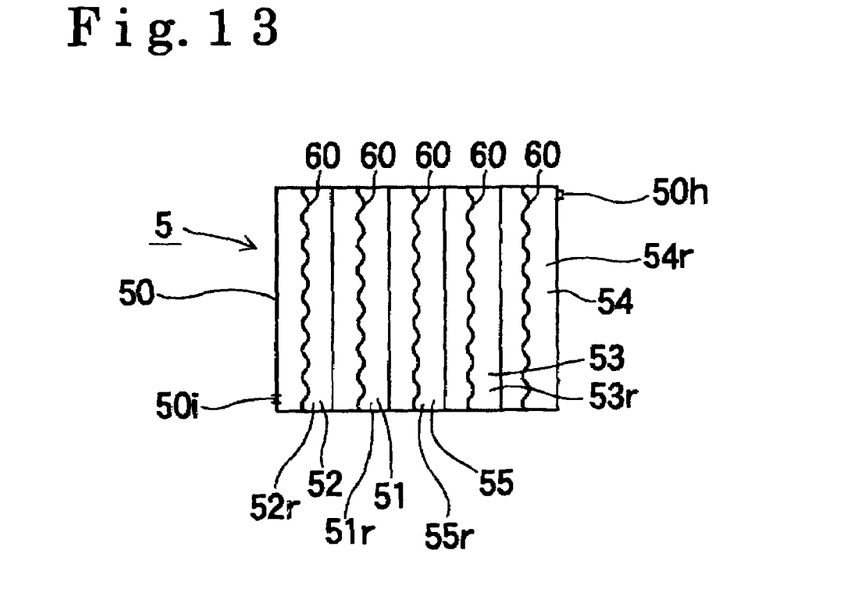
FIG. 13 is a schematic view showing the laminated structure of the heat exchange unit according to a second embodiment of the present invention.

A second embodiment of the present invention is explained referring to FIG. 13. The second embodiment obtains basically the same structure and function as the first embodiment. A different structure or function between the second and the first embodiments is explained as follows. As shown in FIG. 13, the first heat exchanger 51 for cooling the fuel gas to be supplied to the fuel cells 1 for the power generation is provided close to the water entrance 50i (upstream side) relative to the heat exchanger 55 for the combustion exhaust gas in the laminated structure 50. That is, the first heat exchanger 51 is arranged on the relatively lower temperature side in the laminated structure 50. In this case, the moisture and the heat in the fuel gas can be efficiently recovered by the water in the first heat exchanger 51, which has relatively low temperature and high cooling ability.

According to the above embodiments, the heat exchange unit 5 includes the first heat exchanger 51, the second heat exchanger 52, and the third heat exchanger 53. However, one or two of the heat exchangers 51 through 53 can be eliminated in some cases. Basically, at least any one of the heat exchanges 51 through 53 is required to be laminated and integrated with the heat exchanger 54 for the fuel cell cooling water according to the present invention. The aforementioned embodiments are employed for the fuel cell apparatus of the stationary type but not limited thereto. The present embodiments can be employed for the fuel cell apparatus for the vehicle. The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A fuel cell apparatus comprising:
a fuel cell including an electrolyte membrane, a fuel electrode provided on one side of the electrolyte membrane and to which a fuel-containing material is supplied, and an air electrode provided on the other side of the electrolyte membrane and to which air is supplied;
a fuel cell cooling system for cooling the fuel cell by supplying a fuel cell cooling water to the fuel cell;
a hot water storage unit for supplying water for recovering heat generated upon operation of the fuel cell through heat exchange; and
a heat exchange unit including a laminated structure, a water entrance provided at the laminated structure and through which the water from the hot water storage unit flows into the laminated structure, and a water exit provided at the laminated structure and through which the water from the hot water storage unit is discharged out of the laminated structure after the water passes through the laminated structure; wherein the laminated structure of the heat exchange unit is integrally formed into lamination by a heat exchanger for the fuel cell cooling water for recovering heat in the fuel cell cooling water of the fuel cell cooling system and (i) a first heat exchanger for eliminating moisture contained in the fuel-containing material to be supplied to the fuel cell for power generation through the heat exchange unit, (ii) a second heat exchanger for eliminating moisture contained in a fuel off-gas discharged from the fuel cell after the power generation through the heat exchange unit, and (iii) a third heat exchanger for eliminating moisture contained in an air off-gas discharged from the fuel cell after the power generation through the heat exchange unit.

2. A fuel cell apparatus according to claim 1, wherein the heat exchanger for the fuel cell cooling water is provided close to the water exit of the laminated structure relative to the second heat exchanger.

3. A fuel cell apparatus according to claim 1, wherein the second heat exchanger provided close to the water entrance of the laminated structure relative to the heat exchanger for the fuel cell cooling water.

4. A fuel cell apparatus according to claim 3, wherein the first exchanger is provided close to the water entrance of the laminated structure relative to the heat exchanger for the fuel cell cooling water.

5. A fuel cell apparatus according to claim 4, further comprising:
a reformer for generating the fuel-containing material, and wherein the laminated structure of the heat exchange unit includes a heat exchanger for a combustion exhaust gas formed into lamination for recovering heat in the combustion exhaust gas discharged from the reformer.

6. A fuel cell apparatus according to claim 5, wherein the third heat exchanger is provided close to the water entrance of the laminated structure relative to the heat exchanger for the fuel cell cooling water.

7. A fuel cell apparatus according to claim 6, further comprising a radiator for cooling the water before the water enters into the heat exchange unit, and wherein the fuel cell is provided on upper side of the laminated structure, which is arranged next to the radiator.

8. A fuel cell apparatus according to claim 1, wherein the first heat exchanger includes a first entrance formed at a lower portion of the first heat exchanger into which the fuel-containing material to be supplied to the fuel cell for the power generation enters, a first heat exchange passage through which the fuel-containing material flows upward, and a first exit formed at an upper portion of the first heat exchanger from which the fuel-containing material is discharged.

9. A fuel cell apparatus according to claim 8, wherein the second heat exchanger includes a second entrance formed at an upper portion of the second heat exchanger into which the fuel off-gas being discharged after the power generation enters, a second heat exchange passage through which the fuel off-gas flows downward, and a second exit formed at a lower portion of the second heat exchanger from which the fuel off-gas is discharged.

10. A fuel cell apparatus according to claim 9, wherein the third heat exchanger includes a third entrance formed at an upper portion of the third heat exchanger into which the air off-gas being discharged after the power generation enters, a third heat exchange passage through which the air off-gas flows downward, and a third exit formed at a lower portion of the third heat exchanger from which the air off-gas is discharged.

11. A fuel cell apparatus according to claim 10, wherein the heat exchanger for the fuel cell cooling water includes a fourth entrance formed at an upper portion of the heat exchanger for the fuel cell cooling water into which the fuel cell cooling water enters, a fourth heat exchange passage through which the fuel cell cooling water flows downward, and a fourth exit formed at a lower portion of the heat exchanger for the fuel cell cooling water from which the fuel cell cooling water is discharged.

12. A fuel cell apparatus according to claim 11, wherein the heat exchanger for the combustion exhaust gas includes a fifth entrance formed at an upper portion of the heat exchanger for the combustion exhaust gas, a fifth heat exchange passage through which the combustion exhaust gas flows downward, and a fifth exit formed at a lower portion of the heat exchanger for the combustion exhaust gas from which the combustion exhaust gas is discharged.

13. A fuel cell apparatus according to claim 12, wherein the first heat exchanger, the second heat exchanger, the third heat exchanger, the heat exchanger for the fuel cell cooling water, and the heat exchanger for the combustion exhaust gas are defined by plates each having a rectangular thin sheet shape.

14. A fuel cell apparatus according to claim 13, wherein each plates is formed by a plurality of convex portions and a plurality of concave portions being alternately arranged at a center portion of one side and the other side of each plate.

* * * * *